United States Patent [19]

Bestek et al.

[11] Patent Number: 4,636,379

[45] Date of Patent: Jan. 13, 1987

[54] PROCESS FOR PRODUCING CALCIUM HYDROXIDE

[75] Inventors: Heinz Bestek, Velbert; Werner Ewald, Wulfrath; Hans-Peter Hennecke, Wuppertal; Alfred Roeder, Duisburg; Friedrich Schmitz, Wulfrath, all of Fed. Rep. of Germany

[73] Assignee: Rheinische Kalksteinwerke GmbH, Wulfrath, Fed. Rep. of Germany

[21] Appl. No.: 772,773

[22] Filed: Sep. 5, 1985

[30] Foreign Application Priority Data

Sep. 11, 1984 [DE] Fed. Rep. of Germany ....... 3433228

[51] Int. Cl.$^4$ .............................................. C01F 11/02
[52] U.S. Cl. ..................................... 423/640; 423/164
[58] Field of Search ................. 423/640, 636, 635, 164

[56] References Cited

U.S. PATENT DOCUMENTS

| | | | |
|---|---|---|---|
| 1,960,756 | 5/1934 | Sewell et al. | 423/640 |
| 2,053,209 | 9/1936 | Snow | 423/640 |
| 2,497,636 | 2/1950 | Stowell | 423/640 |
| 2,784,062 | 3/1957 | Locke et al. | 423/640 |
| 2,888,324 | 5/1959 | Allen | 423/640 |
| 3,511,600 | 5/1970 | Kim | 423/640 |
| 4,382,911 | 5/1983 | Pennell et al. | 423/640 |
| 4,401,645 | 8/1983 | Gisler | 423/640 |
| 4,464,353 | 8/1984 | Hains | 423/640 |
| 4,472,370 | 9/1984 | Miyata et al. | 423/164 |
| 4,547,349 | 10/1985 | Lane | 423/640 |

Primary Examiner—Andrew H. Metz
Assistant Examiner—Anthony McFarlane
Attorney, Agent, or Firm—Collard, Roe & Galgano

[57] ABSTRACT

A process is provided for producing dry calcium hydroxide by slaking finely divided or ground, softly burnt lime by carrying out the blending of slaking liquid consisting of 30 to 50 parts by volume water and 70 to 50 parts by volume organic solvent with the lime at a temperature below 45° C. in a mixing vessel, subsequently transferring the reaction mixture into a main reaction vessel where the mixture is heated by means of a heating device to a temperature of from 50° to 70° C., and carrying out the final reaction in another reaction vessel. In the mixing vessel, the ratio of lime to slaking liquid is selected in a way such that a final reaction temperature of 85° to 110° C. is reached in the final reaction vessel.

11 Claims, 1 Drawing Figure

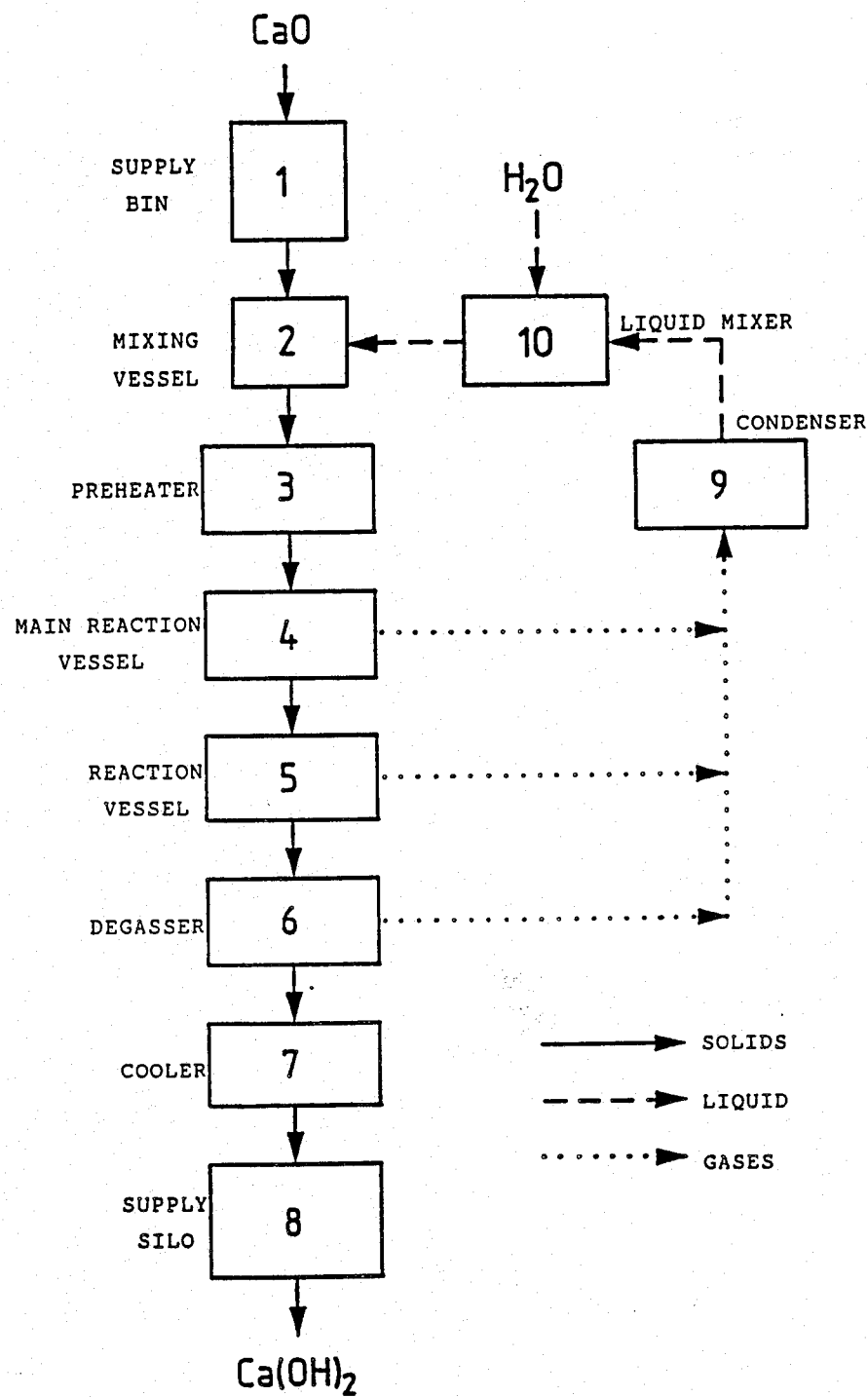

PROCESS FOR PRODUCING CALCIUM HYDROXIDE

The present invention relates to a process for producing dry calcium hydroxide by slaking finely divided or ground, soft-burned lime, whereby the lime is intensively and homogeneously mixed with a slaking liquid consisting of water and a reaction-retarding organic solvent.

Although the processes of lime slaking and lime burning are well known and widely used, the details of the basic mechanisms involved are still not completely known. It is known that the rate of slaking is mainly dependent upon the condition of the burnt lime.

On the one hand, a high degree of burning decreases the slaking rate due to the fact that the crystallites become coarser, leading to a reduction in the specific surface and porosity. As a rule, these changes are related to an undesirable reduction of the specific surface of the calcium hydroxides resulting from the dry slaking process ("Zement-Kalk-Gips" 23, (1970), p. 519).

On the other hand, lower burning temperatures lead to correspondingly high slaking rates and greater specific surfaces. The higher temperatures occurring with a more rapid slaking reaction accelerate the slaking process even more and may be the cause of an undesirable, more pronounced agglomeration of the primary particles.

In the industrial process, the so-called grits forming due to agglomeration must be separated from the more desired reactive products by screening or sifting.

The calcium hydroxide obtained in current production operations is the result of several overlapping reactions. A. Backman ("Zement-Kalk-Gips" 9, (1956), pp. 262–275) makes a distinction between various successive phases: Water absorption, formation of the intermediate product, reaction of the adduct to hydroxide according to the reaction formula

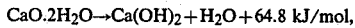

$$CaO.2H_2O \rightarrow Ca(OH)_2 + H_2O + 64.8 \text{ kJ/mol},$$

and finally after-flocculation or agglomeration formation of the final product. With the above course of reaction, the initial mixture passes from the initially aqueous suspension through a solid phase which, finally, decomposes to form a finely divided end product.

Such a course of the slaking reaction can be observed only with relatively hard-burnt lime and particularly in a batch operation. The individual phase times are very short and cannot be separated on a large industrial scale with higher throughput rates. This applies in particular to current operations in which mainly soft-burnt lime qualities are used. In such operations the slaking phases take place at very nearly the same time one next to the other or in parallel, which means the reaction cannot be influenced or controlled even though large industrial plants may be designed for several stages. This is related also to the fact that the reaction is not slowed down by the evaporating water, but rather is accelerated.

As a rule, when processing limes with particularly high reactivity for lime slaking in conventional plants, the formation of hydrate begins even before the slaking water is homogeneously blended into the mixture, with the result that the temperature development in the mixture of burnt lime and water to be reacted is very uneven and may greatly exceed the desirable temperature range at individual points. At the same time, the formation of steam leads to steam slaking which has an adverse effect on the final result because calcium hydroxides with reduced reactivity are thus formed. Separation of the individual stages and their optimal execution is not possible in spite of the fact that industrial lime slaking plants are designed for "several stages" so that the advantages of exact reaction control cannot be exploited. The resulting crude hydrate, contrary to the use of softer-burnt lime, contains even more coarse waste, i.e. grits, than when processing harder-burnt lime because the slaking reactions are uncontrolled and take place in an uncontrollable manner.

Furthermore, it is well known that the slaking rate can be reaction-retarded by adding to the slaking water organic solvents. Particularly suitable are alcohols such as methanol, ethanol, propanol and butanol, as well as ketones, ethers and aldehydes. However, to date, the use of organic solvents to regulate the acceleration of the slaking rate has only been accomplished on a laboratory scale. According to Backman, it is generally believed that a slaking process carried out with the use of organic solvents must be disregarded in view of the great expenditure it would require on an industrial scale. Accordingly, no other disclosures are known with data suggesting how such a process could be engineered for industrial exploitation.

It is an object of the present invention to control the individual reaction steps in the dry slaking of lime by separation in terms of time and space in such a way that reactive limes can be processed without substantial grit formation even on a large industrial scale, producing a calcium hydroxide having an especially large specific surface.

This object is accomplished according to the present invention by carrying out the blending of slaking liquid consisting of 30 to 50 parts by volume water and 70 to 50 parts by volume organic solvent with the lime at a temperature below 45° C. in a mixing vessel, subsequently transferring the reaction mixture into a main reaction vessel where the mixture is heated by means of a heating device to a temperature of from 50° to 70° C., and carrying out the final reaction in another reaction vessel. In the mixing vessel, the ratio of lime to slaking liquid is selected in such a way that a final reaction temperature of 85° to 110° C. is reached in the final reaction vessel. The calcium hydroxides so produced have a specific surface of 35 to 55 m$^2$/g as compared to the calcium hydroxides usually produced having a specific surface of 13 to 19 m$^2$/g. The specific surface of the calcium hydroxides is thus increased by a factor of 2 to 3. Accordingly, the reactivity of such calcium hydroxides is higher. Performing the process in a number of reaction vessels permits a continuous production process.

Preferably, the slaking liquid is blended with the lime at a temperature below 30° C.

Another advantageous feature of the process of the present invention is that the reaction mixture is heated in a preheater preconnected to the main reaction vessel to accelerate the reaction thermally, and that the reaction mixture, before being transferred into the final reaction vessel, is kept in the main reactor until a temperature of 70° to 90° C. has been reached.

It is preferable if the finished calcium hydroxide is cooled in a cooler to temperatures below 50° C. in order to prevent the reactive calcium hydroxide from changing when stored at an elevated temperature.

Preferably, the process is engineered in such a way that the reaction mixture is conveyed through the main reactor by means of a plow blade mixer, single or double paddle screw mixer or conveyor belt.

Furthermore, it is also preferable to include a degassing step following the reaction in the final reaction vessel in which solvent in the finished calcium hydroxide is removed therefrom by application of a vacuum and/or washing with an inert gas in order to assure product purity and the cost saving reuse of solvents.

According to the process of the present invention, a finely dispersed calcium hydroxide with particularly high specific surface and high reactivity is obtained. When processing fine limes, no grits of any type are produced even if the reactivity of the lime is very high. When processing finely divided or particulate burnt lime, the amount of grit formed in the process amounts to only about ⅓ of the quantity formed in conventional slaking plants.

Dry, reactive calcium hydroxide with a very large surface is well suited for detoxicating the off-gases in refuse incinerators, which means that the availability of such products on an industrial scale is significant. As a rule, the products obtained in conventional slaking plants are less suitable for said purpose. Their surface (specific surface) is too small, as a rule, so that to some extent, the amount of absorbent required for bonding the harmful substances exceeds the stoichiometric quantity by several times.

Other objects and features of the present invention will become apparent from the following detailed description considered in connection with the accompanying drawing. It is to be understood, however, that the drawing is designed as an illustration only and not as a definition of the limits of the invention.

BRIEF DESCRIPTION OF THE DRAWING

The drawing shows the flow diagram of the process of the present invention.

Now turning to the drawing, fine white lime is taken from a supply bunker or bin 1 and loaded in a mixing vessel 2 equipped with a high-speed agitator. Mixing vessel 2 is fitted with a cooling system and is first loaded with the reaction liquid.

Following adequate homogenizing of the reaction mixture, the mixture is conveyed by way of preheater 3 into main reaction vessel 4. Reaction vessel 4 is designed, for example as a thermally insulated twin paddle screw conveyor. Here, the reaction mixture, which solidifies as the reaction starts, is loosened up and then transferred as a coarsely crushed material to reaction vessel 5 for further reaction.

In the degassing stage of degasser 6, solvent in the finished calcium hydroxide is removed by applying a vacuum and/or using a washing or flushing gas.

On cooling of the calcium hydroxide in a cooler 7, the finished product is stored in a supply silo 8.

The organic vapors generated in the course of reaction in reactor vessels 2 to 6 are condensed in the after-connected process stage of condenser 9, in which the organic phase is recovered with the help of, for example a jet washer and column.

In another process state 10, the recovered condensate is mixed with the amount of water required to produce the reaction liquid to be reused.

The above-described process may also be used if stages (3), (4) and (5) are carried out in one reactor provided with a heating system. In this case, the process is usefully carried out as a batch (discontinuous) operation.

The invention is explained in greater detail with the help of the following examples:

EXAMPLE ACCORDING TO PRIOR ART PROCESS

Fine white lime

| | |
|---|---|
| Reactivity according to DIN 1060 | $t_u$ = 2 min |
| Quantity | 28 kg |
| Temperature | 20° C. |

Water

| | |
|---|---|
| Quantity | 17.9 liters |
| Temperature | 20° C. |

Solvent

| | |
|---|---|
| Quantity | — |
| Temperature | — |

Mixture lime/slaking liquid

| | |
|---|---|
| Temperature during premixing | above 20° C. |
| Temperature after preheating | not applicable |
| Temperature after reaction | 124° C. |

Finished product

| | |
|---|---|
| Quantity | 37 kg |
| Liter weight | 360 g/liter |
| Specific surface | 16 m²/g |

EXAMPLE 1 ACCORDING TO PROCESS OF PRESENT INVENTION

Fine white lime

| | |
|---|---|
| Reactivity according to DIN 1060 | $t_u$ = 2 min |
| Quantity | 28 kg |
| Temperature | 20° C. |

Water

| | |
|---|---|
| Quantity | 10.1 liters |
| Temperature | 20° C. |

Solvent—Methanol

| | |
|---|---|
| Quantity | 14.2 kg |
| Temperature | 20° C. |

Mixture lime/slaking liquid

| | |
|---|---|
| Temperature of premixture | 25° C. |

-continued

| | |
|---|---|
| Temperature after preheating | 59° C. |
| Temperature after reaction | 98° C. |

Finished product

| | |
|---|---|
| Quantity | 37 kg |
| Liter weight | 270 g/liter |
| Specific surface | 36 m²/g |

EXAMPLE 2 ACCORDING TO PROCESS OF PRESENT INVENTION

Fine white lime

| | |
|---|---|
| Reactivity according to DIN 1060 | $t_u = 2$ min |
| Quantity | 28 kg |
| Temperature | 20° C. |

Water

| | |
|---|---|
| Quantity | 10.1 liters |
| Temperature | 20° C. |

Solvent—Methanol

| | |
|---|---|
| Quantity | 15.2 kg |
| Temperature | 20° C. |

Mixture lime/slaking liquid

| | |
|---|---|
| Temperature of premixture | 24° C. |
| Temperature after preheating | 59° C. |
| Temperature after reaction | 90° C. |

Finished product

| | |
|---|---|
| Quantity | 37 kg |
| Liter weight | 280 g/liter |
| Specific surface | 41 m²/g |

EXAMPLE 3 ACCORDING TO PROCESS OF PRESENT INVENTION

Fine white lime

| | |
|---|---|
| Reactivity according to DIN 1060 | $t_u = 2$ min |
| Quantity | 3.0 kg |
| Temperature | 20° C. |

Water

| | |
|---|---|
| Quantity | 1.4 liter |
| Temperature | 20° C. |

Solvent—2-methylpropanol-(2)

| | |
|---|---|
| Quantity | 2.9 liters |
| Temperature | 20° C. |

Mixture lime/slaking liquid

| | |
|---|---|
| Temperature premixture | 23° C. |
| Temperature after preheating | 57° C. |
| Temperature after reaction | 92° C. |

Finished product

| | |
|---|---|
| Quantity | 4.0 kg |
| Liter weight | 270 g/liter |
| Specific surface | 42 m²/g |

EXAMPLE 4 ACCORDING TO PROCESS OF PRESENT INVENTION

Fine white lime

| | |
|---|---|
| Reactivity according to DIN 1060 | $t_u = 1.1$ min |
| Quantity | 3.0 kg |
| Temperature | 10° C. |

Water

| | |
|---|---|
| Quantity | 1.1 liters |
| Temperature | 10° C. |

Solvent—Methanol

| | |
|---|---|
| Quantity | 2.1 liters |
| Temperature | 10° C. |

Mixture lime/slaking liquid

| | |
|---|---|
| Temperature premixture | 32° C. |
| Temperature after preheating | 60° C. |
| Temperature after reaction | 96° C. |

Finished product

| | |
|---|---|
| Quantity | 4.0 kg |
| Liter weight | 250 g/liter |
| Specific surface | 48 m²/g |

While only a single embodiment of the present invention has been shown and described, it will be obvious that many changes and modifications may be made thereunto without departing from the spirit and scope of the invention.

What is claimed is:

1. A process for producing dry calcium hydroxide by slaking finely divided or ground, softly burnt lime, where the lime is intensively and homogeneously mixed with a slaking liquid consisting of water and a reaction-retarding, organic solvent, comprising the steps of:

mixing the slaking liquid consisting of 30 to 50 parts by volume water and 70 to 50 parts by volume of organic solvent with the lime at a temperature below 45° C. in a mixing vessel;

transferring the reaction mixture to a main reaction vessel for reacting where the mixture is heated by a heating device to a temperature of from 50° to 70° C.; and transferring the mixture to a final reaction vessel for final reacting whereby calcium hydroxide is formed;

the ratio between lime and slaking liquid in the mixing vessel being such that a final reaction temperature of from 85° to 110° C. is reached in said final reaction vessel.

2. The process as defined in claim 1, wherein the mixing of the slaking liquid with the lime is carried out at a temperature below 30° C.

3. The process as defined in claim 1, which further comprises the step of heating the reaction mixture before transferring the mixture to the main reaction vessel in a preheater connected to the main reaction vessel.

4. The process as defined in claim 3, wherein the reaction mixture, before being transferred into the final reaction vessel, is kept in the main reaction vessel until it reaches a temperature of 70° to 90° C.

5. The process as defined in claim 1, which further comprises the step of cooling the finished calcium hydroxide in a cooler to temperatures below 50° C.

6. The process as defined in claim 1, wherein the reaction mixture is conveyed through the main reaction vessel by means of a plow blade mixer.

7. The process as defined in claim 1, wherein the reaction mixture is conveyed through the main reaction vessel by means of a paddle screw mixer.

8. The process as defined in claim 1, wherein the reaction mixture is conveyed through the main reaction vessel by means of a conveyor belt.

9. The process as defined in claim 1, which further comprises the step, subsequent to final reacting, of degassing said calcium hydroxide wherein solvent in the calcium hydroxide is removed by application of a vacuum.

10. The process as defined in claim 1, which further comprises the step, subsequent to final reacting, of degassing said calcium hydroxide wherein solvent in the calcium hydroxide is removed by application of a vacuum and washing with an inert gas.

11. The process as defined in claim 1, which further comprises the step of, subsequent to final reacting, degassing said calcium hydroxide wherein solvent in the calcium hydroxide is removed by washing with an inert gas.

* * * * *